United States Patent
Iijima et al.

(10) Patent No.: US 9,249,711 B2
(45) Date of Patent: Feb. 2, 2016

(54) SYSTEM FOR COLLECTING CARBON DIOXIDE IN FLUE GAS

(71) Applicants: MITSUBISHI HEAVY INDUSTRIES, LTD., Tokyo (JP); THE KANSAI ELECTRIC POWER CO., INC., Osaka-shi, Osaka (JP)

(72) Inventors: Masaki Iijima, Hiroshima (JP); Takashi Kamijo, Hiroshima (JP); Yasuyuki Yagi, Hyogo (JP); Kouki Ogura, Hyogo (JP)

(73) Assignees: MITSUBISHI HEAVY INDUSTRIES, LTD., Tokyo (JP); THE KANSAI ELECTRIC POWER CO., INC., Osaka-shi (JP)

( * ) Notice: Subject to any disclaimer, the term of this patent is extended or adjusted under 35 U.S.C. 154(b) by 19 days.

(21) Appl. No.: 14/094,180

(22) Filed: Dec. 2, 2013

(65) Prior Publication Data

US 2014/0086798 A1    Mar. 27, 2014

Related U.S. Application Data

(62) Division of application No. 12/368,474, filed on Feb. 10, 2009, now Pat. No. 8,623,286.

(30) Foreign Application Priority Data

Jul. 8, 2008    (JP) .................................. 2008-178260

(51) Int. Cl.
*F01N 3/28* (2006.01)
*B01D 53/14* (2006.01)
(Continued)

(52) U.S. Cl.
CPC .......... *F01N 3/2882* (2013.01); *B01D 53/1412* (2013.01); *B01D 53/346* (2013.01);
(Continued)

(58) Field of Classification Search
CPC .. B01D 53/1412; B01D 53/346; B01D 53/62; B01D 2257/504; F23J 15/006; F23J 15/02; F23J 2215/50; F23J 2900/15061; F23L 11/00; Y02C 10/04; F01N 3/2882; F01N 3/20
See application file for complete search history.

(56) References Cited

U.S. PATENT DOCUMENTS 3,395,512 A * 8/1968 Finney, Jr. .............. B01D 53/26
                                                                110/119
3,908,969 A    9/1975  Baum et al.
(Continued)

FOREIGN PATENT DOCUMENTS

EP    1695756 A1    8/2006
GB    1421148 A    1/1976
(Continued)

OTHER PUBLICATIONS

Russian Official Decision of Grant dated Jun. 15, 2010, issued in corresponding Russian Patent Application No. 2009104915.
(Continued)

*Primary Examiner* — Shogo Sasaki
(74) *Attorney, Agent, or Firm* — Westerman, Hattori, Daniels & Adrian, LLP

(57) ABSTRACT

A system for collecting carbon dioxide in flue gas includes a stack that discharges flue gas discharged from an industrial facility to outside, a blower that is installed at the downstream side of the stack and draws the flue gas therein, a carbon-dioxide collecting device that collects carbon dioxide in the flue gas drawn in by the blower, and a gas flow sensor arranged near an exit side within the stack. A drawing amount of the flue gas by the blower to the carbon-dioxide collecting device is increased until an flow rate of the flue gas from the stack becomes zero in the gas flow sensor, and when the discharged amount of flue gas from the stack becomes zero, drawing in any more than that amount is stopped, and the carbon dioxide in the flue gas is collected while the flue gas is drawn in by a substantially constant amount.

2 Claims, 7 Drawing Sheets

(51) Int. Cl.

| | | |
|---|---|---|
| *B01D 53/34* | (2006.01) | |
| *B01D 53/62* | (2006.01) | |
| *F23J 15/00* | (2006.01) | |
| *F23J 15/02* | (2006.01) | |
| *F23L 11/00* | (2006.01) | |
| *F01N 3/20* | (2006.01) | |

(52) U.S. Cl.
CPC .............. *B01D 53/62* (2013.01); *F01N 3/20* (2013.01); *F23J 15/006* (2013.01); *F23J 15/02* (2013.01); *F23L 11/00* (2013.01); *B01D 2257/504* (2013.01); *F23J 2215/50* (2013.01); *F23J 2900/15061* (2013.01); *Y02C 10/04* (2013.01)

(56) References Cited

U.S. PATENT DOCUMENTS

| | | | |
|---|---|---|---|
| 4,113,005 A | | 9/1978 | Cantrell, Jr. |
| 4,234,170 A | * | 11/1980 | Suitlas ..................... C21C 5/40 266/158 |
| 4,245,569 A | | 1/1981 | Fallon, III |
| 4,273,312 A | * | 6/1981 | Phillips, Jr. ............... C21C 5/38 266/144 |
| 4,436,506 A | | 3/1984 | Berkhof |
| 4,487,139 A | | 12/1984 | Warner |
| 4,669,706 A | * | 6/1987 | Yoshida ................... C21C 5/40 266/158 |
| 5,347,958 A | | 9/1994 | Gordon, Jr. |
| 5,505,766 A | | 4/1996 | Chang |
| 5,606,495 A | * | 2/1997 | Jaidka .................... B01D 46/46 422/105 |
| 5,609,522 A | | 3/1997 | Szwartz |
| 2006/0204425 A1 | | 9/2006 | Kamijo et al. |
| 2006/0240368 A1 | | 10/2006 | Duesel, Jr. et al. |
| 2009/0252659 A1 | | 10/2009 | Iijima et al. |

FOREIGN PATENT DOCUMENTS

| | | |
|---|---|---|
| JP | 57-164910 A | 10/1982 |
| JP | 62-41514 A | 2/1987 |
| JP | 63-74938 U | 5/1988 |
| JP | 03-193116 A | 8/1991 |
| JP | 7-241440 A | 9/1995 |
| JP | 10-165752 A | 6/1998 |
| JP | 2006-75758 A | 3/2006 |
| JP | 2006-232596 A | 9/2006 |
| JP | 2007-284273 A | 11/2007 |
| RU | 2090245 C1 | 9/1997 |
| WO | 2005/100857 A1 | 10/2005 |

OTHER PUBLICATIONS

Extended European Search Report dated Jul. 6, 2012, issued in corresponding European Patent Application No. 09152751.5 (13 pages).
European Search Report dated Mar. 2, 2012, issued in corresponding European Patent Application No. 09152751.5.
Japanese Office Action dated Feb. 14, 2012, issued in corresponding Japanese Patent Application No. 2008-178260.
Decision of a Patent Grant dated Jun. 19, 2012, issued in corresponding Japanese Patent Application No. 2008-178260, with English translation (5 pages).
U.S. Non-Final Office Action dated Jan. 23, 2015, issued in related U.S. Appl. No. 14/094,197 (13 pages).
Final Office Action dated Sep. 23, 2015, issued in U.S. Appl. No. 14/094,197 (16 pages).

* cited by examiner

SYSTEM FOR COLLECTING CO$_2$ IN FLUE GAS
10-4B

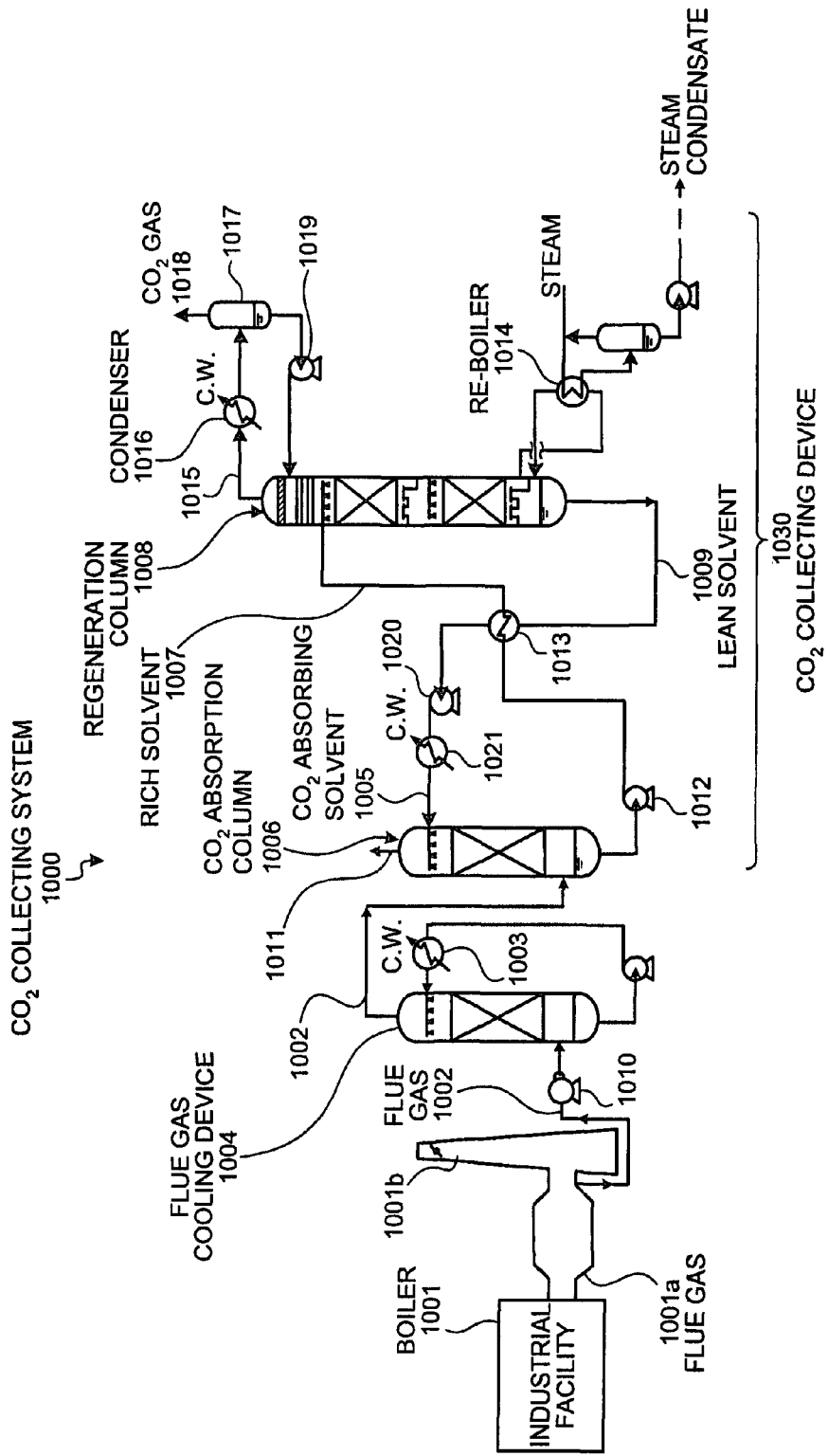

SYSTEM FOR COLLECTING CARBON DIOXIDE IN FLUE GAS

CROSS REFERENCE TO RELATED APPLICATIONS

This is a divisional of U.S. application Ser. No. 12/368,474 filed on Feb. 10, 2009, which is now U.S. Pat. No. 8,623,286 B2, the entire contents of which is incorporated herein by reference.

BACKGROUND OF THE INVENTION

1. Field of the Invention

The present invention relates to a system for collecting carbon dioxide in flue gas, capable of stably processing all the carbon dioxide in the flue gas discharged from an industrial facility such as a gas turbine, a furnace, or a boiler.

2. Description of the Related Art

Conventionally, to collect carbon dioxide in flue gas, for example, a system is adopted when an amine-based absorbing solvent is used as a $CO_2$ absorbing solvent to remove and collect $CO_2$ from flue gas; firstly, a process is performed to bring the $CO_2$ absorbing solvent into contact with the flue gas in an absorption column, and thereafter the $CO_2$ absorbing solvent that has absorbed $CO_2$ is heated in a regeneration column; secondly, $CO_2$ is freed and the $CO_2$ absorbing solvent is regenerated, and circulated in the absorption column again, and finally, reused (for example, see Japanese Patent Application Laid-open No. H3-193116).

FIG. 9 is an example of a conventional system for collecting $Co_2$ in flue gas. As shown in FIG. 9, a conventional $CO_2$ collecting system 1000 includes an flue gas cooling device 1004 that cools flue gas 1002 containing $CO_2$ discharged from an industrial facility 1001 such as a boiler and a gas turbine by cooling water 1003, a $CO_2$ absorption column 1006 that brings the flue gas 1002 containing cooled $CO_2$ into contact with a $CO_2$ absorbing solvent 1005 absorbing $CO_2$ to remove the $CO_2$ from the flue gas 1002, and a regeneration column 1008 that releases the $CO_2$ from a $CO_2$ absorbing solvent (rich solvent) 1007 absorbing the $CO_2$ to regenerate the $CO_2$ absorbing solvent. In this device, a regenerated $CO_2$ absorbing solvent (lean solvent) 1009 from which the $CO_2$ is removed in the regeneration column 1008 is recycled as the $CO_2$ absorbing solvent in the $CO_2$ absorption column 1006. The $CO_2$ absorption column 1006 and the regeneration column 1008 configure a $CO_2$ collecting device 1030.

In a $CO_2$ collection method using the conventional $CO_2$ collecting device 1030, the flue gas 1002 containing $CO_2$, discharged from the industrial facility such as a boiler and a gas turbine, is firstly sent to the flue gas cooling device 1004 after pressure is raised by an flue gas fan 1010, cooled by cooling water 1003, and thereafter sent to the $CO_2$ absorption column 1006.

In the $CO_2$ absorption column 1006, the flue gas 1002 is countercurrently contacted with, for example, the $CO_2$ absorbing solvent 1005 based on an amine-based absorbent, and the $CO_2$ in the flue gas 1002 is absorbed in the $CO_2$ absorbing solvent 1005 due to a chemical reaction ($R-NH_2 + H_2O + CO_2 \rightarrow R-NH_3HCO_3$), and flue gas 1011 from which the $CO_2$ is removed is released from the system. The $CO_2$ absorbing solvent 1007 absorbing the $CO_2$ is also called a rich solvent. Pressure is raised for the rich solvent 1007 by a rich solvent pump 1012, and heated by a rich/lean solvent heat exchanger 1013 by the $CO_2$ absorbing solvent (lean solvent) 1009 regenerated by removing $CO_2$ in the regeneration column 1008 described later, and supplied to the regeneration column 1008.

The rich solvent 1007 released from the upper part of the regeneration column 1008 to the interior of the regeneration column 1008 receives heat from water vapor generated inside the regeneration column 1008 and a large amount of $CO_2$ is discharged. The $CO_2$ absorbing solvent from which a portion or a large amount of $CO_2$ is released inside the regeneration column 1008 is called a semi-lean solvent. The semi-lean solvent becomes a $CO_2$ absorbing solvent from which almost all of the $CO_2$ is removed by the time it reaches the lower portion of the regeneration column 1008. The absorbing solvent regenerated by removing almost all of the $CO_2$ is called a lean solvent. A re-boiler 1014 heats the lean solvent by using steam. Meanwhile, $CO_2$ gas 1015 together with water vapor released from the rich solvent and the semi-lean solvent inside the regeneration column 1008 is derived from the head top part of the regeneration column 1008, the water vapor is condensed by an overhead condenser 1016, water is separated by a separation drum 1017, and $CO_2$ gas 1018 is released from the system and collected. The water separated by the separation drum 1017 is supplied by a condensed-water circulating pump 1019 to the upper part of regeneration column 1008. The regenerated $CO_2$ absorbing solvent (lean solvent) 1009 is cooled by the rich solvent 1007 by the rich/lean solvent heat exchanger 1013, which is followed by raising the pressure by a lean solvent pump 1020, and the resultant water is cooled by a lean solvent cooler 1021, and thereafter supplied to the $CO_2$ absorption column 1006.

In FIG. 9, reference numeral 1001a is a stack flue of the industrial facility 1001 such as a boiler and a gas turbine, and 1001b is a stack having a damper on the inside. There are cases that the $CO_2$ collecting device is installed after the system is completed to collect $CO_2$ from an existing source of the flue gas and cases that it is simultaneously attached to a new source of the flue gas.

As the conventional effective utilization of the carbon dioxide in flue gas, some of the carbon dioxide in flue gas is merely collected to produce carbon dioxide for carbonated drinks and dry ice. However, the greenhouse effect caused by carbon dioxide is recently pointed out as one of the causes of global warming. Measures are becoming an urgent necessity internationally to protect the global environment, and also, the source of generating the carbon dioxide affects every field of human activity, which burns fossil fuels, and demands of restricting the discharge tend are becoming even stronger. Along with this tendency, in power generation facilities such as thermal power stations that use a large amount of fossil fuels, there have been a method in which flue gas of industrial facilities such as a boiler and a gas turbine is brought into contact with a $CO_2$ absorbing solvent, all of $CO_2$ in the flue gas is removed and collected, and a method for storing the collected $CO_2$ without releasing it into the atmosphere.

As described above, in the conventional $CO_2$ collecting system 1000, there has been proposed that, when collecting all of carbon dioxide in flue gas, a containing unit such as a valve or damper that can be opened and closed inside the stack 1001b, as shown in FIG. 9, is installed to close and stop during the operation of the $CO_2$ collecting device and to release when the operation of the $CO_2$ collecting device is stopped while the source of the flue gas is kept operating.

However, at the time of stopping the operation of the $CO_2$ collecting device, unless an operation such as containment of the valve, damper or the like, which closes the interior of the stack or releasing is surely performed, discharge of flue gas is not performed smoothly, and there are occasions that the industrial facilities (such as gas turbines) at the upstream side are adversely affected.

Further, in a turbine facility that generates electricity of 200,000 kilowatts in which 3000 ton of carbon dioxide are processed in each day, an amount of discharged flue gas becomes enormous and a stack having, for example, a diameter of 7 to 10 meters is required. Under such circumstances, a facility of a containing unit such as a valve and a damper that contains the flue gas needs to be larger.

Accordingly, a system capable of drawing in substantially all of a large amount of flue gas to a carbon-dioxide collecting device in a simple, stable, and safe manner has been desired.

SUMMARY OF THE INVENTION

It is an object of the present invention to at least partially solve the problems in the conventional technology.

According to an aspect of the present invention, a system for collecting carbon dioxide in flue gas includes: a stack that discharges flue gas discharged from an industrial facility to outside; a blower that is installed at a downstream side of the stack and draws the flue gas therein; a carbon-dioxide collecting device that collects carbon dioxide in the flue gas drawn in by the blower; and a gas flow sensor that is arranged near an exit side within the stack and measures a gas flow rate. A drawing amount of the flue gas to the carbon-dioxide collecting device by the blower is increased until an flow rate of the flue gas from the stack becomes zero in the gas flow sensor, and when the flow rate of the flue gas from the stack becomes zero, drawing in any more than the amount is stopped, and the carbon dioxide in the flue gas is collected while drawing in the flue gas by a substantially constant amount.

According to another aspect of the present invention, a system for collecting carbon dioxide in flue gas includes: a stack that discharges flue gas discharged from an industrial facility to outside; a blower that is installed at a downstream side of the stack and draws the flue gas therein; a carbon-dioxide collecting device that collects carbon dioxide in the flue gas drawn in by the blower; and a sensor that is arranged at least one location in a stack flue at a downstream side of the stack within the stack and measures gas temperature or gas type. A drawing amount of the flue gas by the blower to the carbon-dioxide collecting device is increased until the gas temperature or a concentration of the gas type changes in the sensor, and when the gas temperature or the concentration of the gas type changes, drawing in any more than the amount is stopped, and the carbon dioxide in the flue gas is collected while drawing in the flue gas by a substantially constant amount.

According to still another aspect of the present invention, a system for collecting carbon dioxide in flue gas includes: a stack that discharges flue gas discharged from an industrial facility to outside; a blower that is installed at a downstream side of the stack and draws the flue gas therein; a carbon-dioxide collecting device that collects carbon dioxide in the flue gas drawn in by the blower; and a plurality of sensors that are arranged in an stack flue at an upstream side of the stack and at a downstream side of the stack and measure gas temperature or a concentration of gas type. A drawing amount of the flue gas by the blower to the carbon-dioxide collecting device is increased until a difference in the gas temperature or the concentration of the gas type is generated, and when the difference is generated, drawing in any more than the amount is stopped, and the carbon dioxide in the flue gas is collected while drawing in the flue gas by a substantially constant amount.

In the system for collecting carbon dioxide in flue gas, the gas type may be oxygen or carbon dioxide.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a schematic diagram of a conventional system for collecting carbon dioxide in flue gas.

DETAILED DESCRIPTION OF THE PREFERRED EMBODIMENTS

The present invention is explained below in detail with reference to the accompanying drawings. The present invention is not limited to the embodiments. In addition, constituent elements in the following embodiments include elements that readily occur to those skilled in the art or substantially equivalent elements.

A system for collecting carbon dioxide in flue gas according to a first embodiment of the present invention is explained with reference to the drawings.

Figure 1:
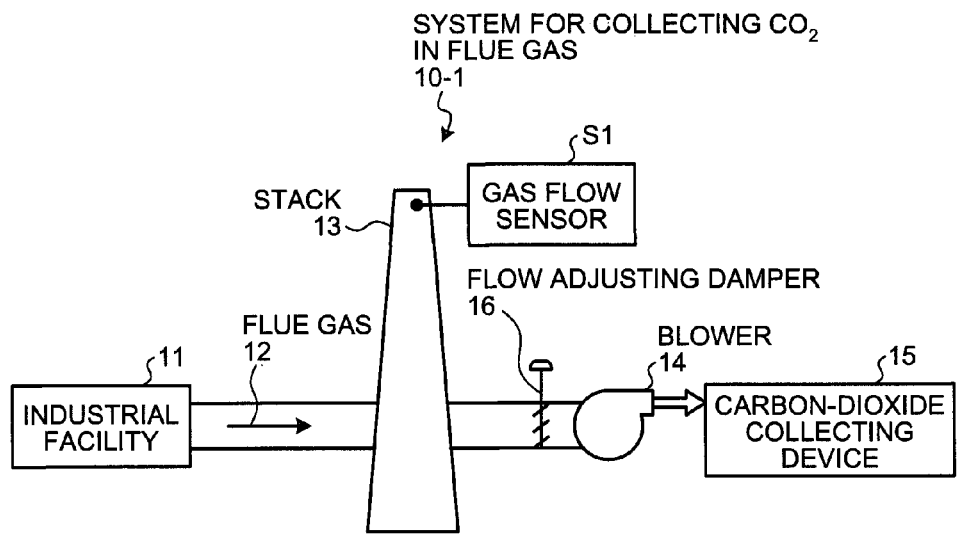
FIG. 1 is a schematic diagram of a system for collecting carbon dioxide in flue gas according to a first embodiment of the present invention.

FIG. 1 is a schematic diagram of the system for collecting carbon dioxide in flue gas according to the first embodiment.

As shown in FIG. 1, a system for collecting carbon dioxide in flue gas 10-1 according to the first embodiment includes a stack 13 that discharges flue gas 12 discharged from an industrial facility 11 to outside, a blower 14 that is installed at the downstream side of the stack 13 and draws the flue gas 12 therein, a carbon-dioxide collecting device 15 that collects carbon dioxide in the flue gas 12 drawn in by the blower 14, and a gas flow sensor S1 arranged near an exit side within the stack 13. In the gas flow sensor S1, a drawing amount of the flue gas 12 by the blower 14 to the carbon-dioxide collecting device 15 is increased until an exhaust flow rate of the flue gas from the stack 13 becomes zero, and when the discharged amount of flue gas from the stack 13 becomes zero, drawing in any more than that amount is stopped and the carbon dioxide in the flue gas is collected while the flue gas 12 is drawn in by a substantially constant amount.

The carbon-dioxide collecting device 15 is not particularly limited and can be any device that collects carbon dioxide, similar to the $CO_2$ collecting device shown in the FIG. 9.

In the first embodiment, the exhaust flow rate to the outside of the flue gas 12 from the stack 13 is monitored all the time in the gas flow sensor S1.

Figure 2:
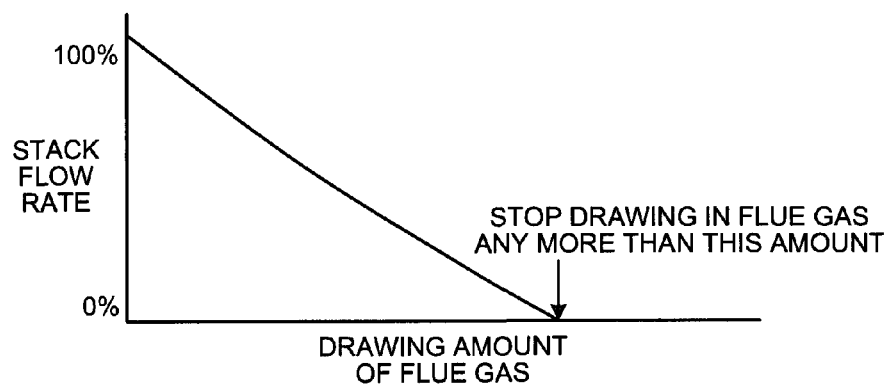
FIG. 2 depicts a relationship between a discharged amount of flue gas from a stack and a drawing amount of flue gas in the first embodiment.

When the drawing amount of the flue gas 12 by the blower 14 to the carbon-dioxide collecting device 15 is increased until the exhaust flow rate from the stack 13 becomes zero, the discharged amount of the flue gas 12 to the outside from the stack declines slowly as shown in FIG. 2. When the discharged amount of flue gas from the stack 13 becomes zero, drawing in any more than that amount by the blower 14 is stopped, and the carbon dioxide in the flue gas 12 is collected by the carbon-dioxide collecting device 15 while drawing in the flue gas 12 by the blower 14 while maintaining the drawing amount to become approximately zero (substantially constant amount).

Accordingly, all of the flue gas from the industrial facility 11 can be stably drawn into the carbon-dioxide collecting device 15 and all of the carbon dioxide in flue gas can be collected.

Further, in the carbon-dioxide collecting device 15, since air is mixed in the flue gas which is a target to be processed, malfunctions is not generated even when outside atmosphere is drawn into the carbon-dioxide collecting device 15 from the stack 13.

In the present invention, the industrial facility is not particularly limited, and examples thereof can include a boiler, a combustion furnace, and a gas turbine facility, which generate carbon dioxide. When the gas turbine facility is used, a heat recovery steam generator (HRSG) that collects heat having high temperature (about 580° C.) of the flue gas 12 discharged from a gas turbine can be installed.

A system for collecting carbon dioxide in flue gas according to a second embodiment of the present invention is explained next with reference to the drawings.

Figure 3A:
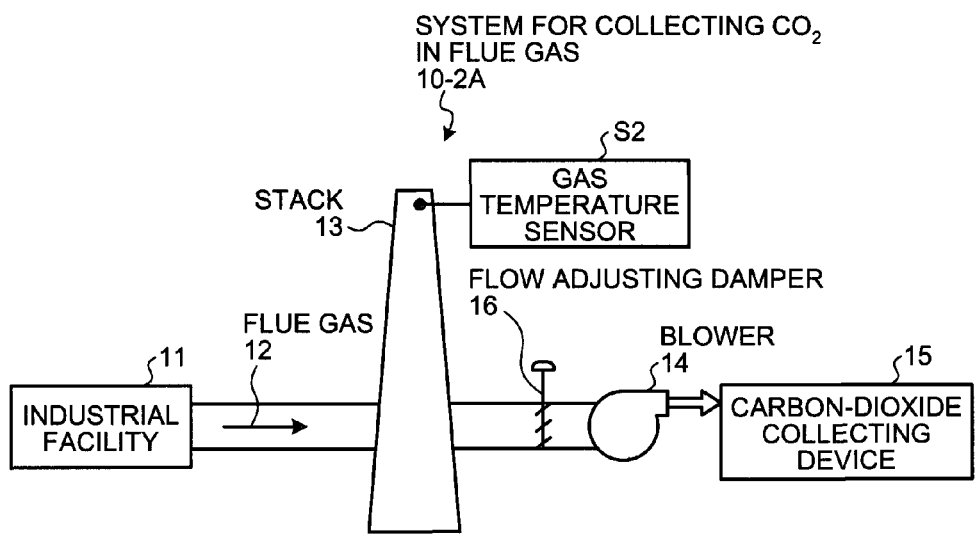
FIG. 3A is a schematic diagram of a system for collecting carbon dioxide in flue gas according to a second embodiment of the present invention.

FIG. 3A is a schematic diagram of the system for collecting carbon dioxide in flue gas according to the second embodiment.

As shown in FIG. 3A, a system for collecting carbon dioxide in flue gas 10-2A according to the second embodiment includes the stack 13 that discharges the flue gas 12 discharged from the industrial facility 11 to the outside, the blower 14 that is installed at the downstream side of the stack 13 and draws the flue gas 12 therein, the carbon-dioxide collecting device 15 that collects carbon dioxide in the flue gas 12 drawn in by the blower 14, and a gas temperature sensor S2 arranged within the stack 13. In the gas temperature sensor S2, the drawing amount of the flue gas 12 by the blower 14 to the carbon-dioxide collecting device 15 is increased until the gas temperature declines, and when the gas temperature declines, drawing in any more than that amount is stopped and the carbon dioxide in the flue gas is collected while the flue gas 12 is drawn in by a substantially constant amount.

That is, in the gas temperature sensor S2, the exhaust temperature of the flue gas to be discharged from the stack 13 to the outside is monitored all the time by the gas temperature sensor S2.

Figure 4:
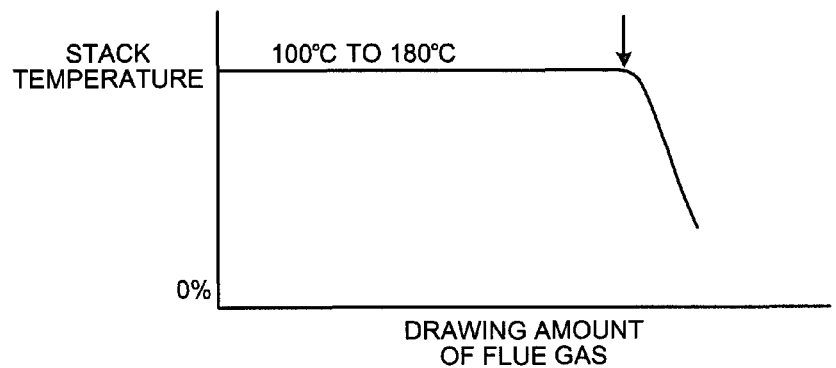
FIG. 4 depicts a relationship between discharged amount of flue gas from a stack and a drawing amount of flue gas in the second embodiment.

Even when the drawing amount of the flue gas 12 by the blower 14 to the carbon-dioxide collecting device 15 is increased, the exhaust temperature from the stack 13 is almost maintained at constant temperature (100 to 180° C.) up to a certain time point as shown in FIG. 4. However, when atmosphere from outside the stack 13 flows in within the stack 13, the flue gas 12 is cooled by the atmosphere, and the temperature declines. Additionally, immediately before the temperature change starts (a point indicated by an arrow in FIG. 4), drawing in the flue gas 12 by the blower 14 any more than that amount is stopped, and the carbon dioxide in the flue gas 12 is collected by the carbon-dioxide collecting device 15 while drawing in the flue gas 12 by the blower 14 while maintaining the stopped drawing amount (substantially constant amount).

Accordingly, all of the flue gas from the industrial facility 11 can be stably drawn into the carbon-dioxide collecting device 15 and all of the carbon dioxide in flue gas can be collected.

Figure 3B:
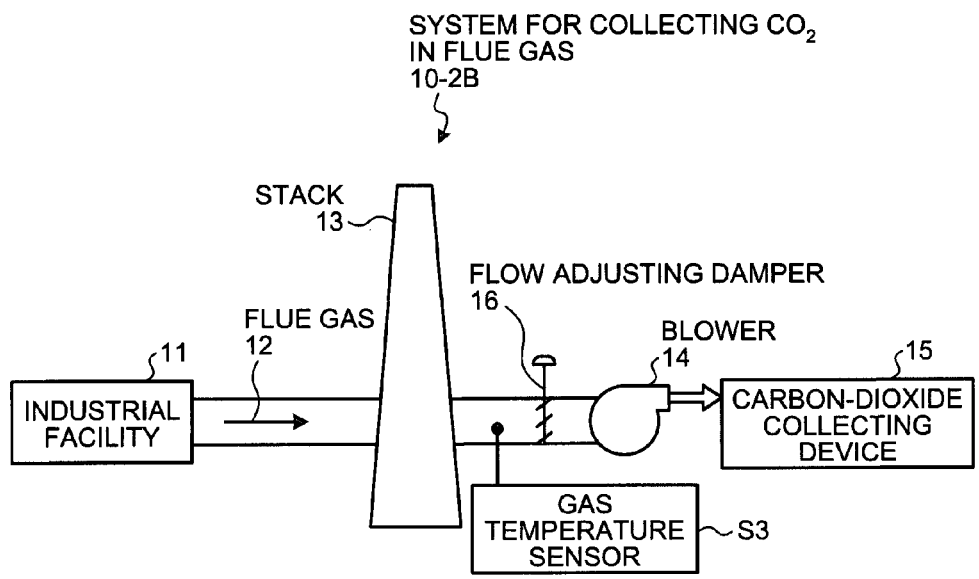
FIG. 3B is a schematic diagram of another system for collecting carbon dioxide in flue gas according to the second embodiment.

FIG. 3B depicts another system for collecting carbon dioxide in flue gas 10-2B according to the second embodiment. A gas temperature sensor S3 is arranged before the blower 14 at the downstream side of the stack, and similarly, the gas temperature is measured and the flue gas is drawn in.

By using the gas temperature sensor S3 to control the drawing amount while monitoring the gas temperature in the same way as the gas temperature sensor S2, all of the flue gas from the industrial facility 11 can be stably drawn into the carbon-dioxide collecting device 15 and all of the carbon dioxide in the flue gas can be collected.

Figure 3C:
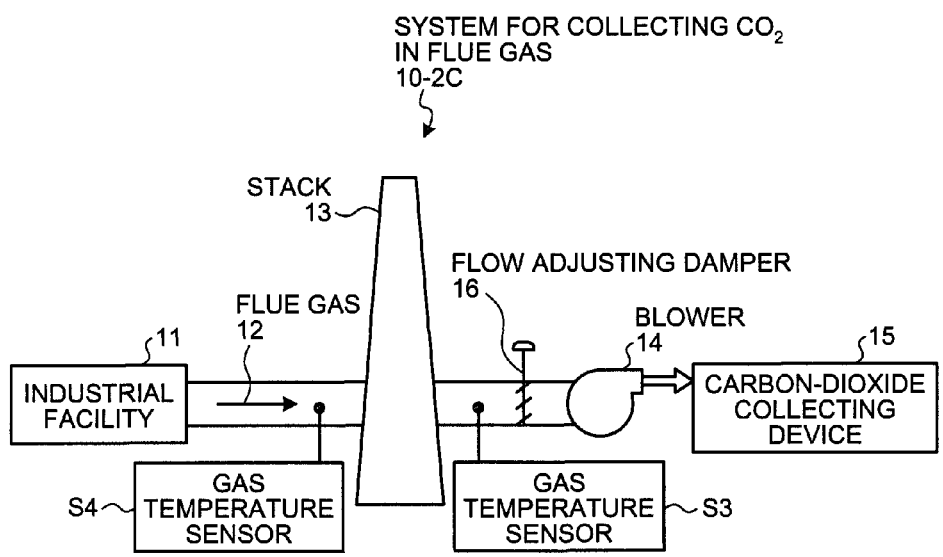
FIG. 3C is a schematic diagram of still another system for collecting carbon dioxide in flue gas according to the second embodiment.

FIG. 3C depicts still another system for collecting carbon dioxide in flue gas 10-2C according to the second embodiment. The gas temperature sensor S3 is arranged before the blower 14 and at the downstream side of the stack 13, and a gas temperature sensor S4 also is arranged within a stack flue at the upstream of the stack 13.

In the gas temperature sensors S3 and S4, the drawing amount of the flue gas 12 by the blower 14 to the carbon-dioxide collecting device 15 is increased until a difference in the flue gas temperature is generated, and when the difference in the gas temperatures is generated, drawing in any more than that amount is stopped and the carbon dioxide in flue gas is collected while drawing in the flue gas by a substantially constant amount.

Accordingly, all of the flue gas from the industrial facility 11 can be stably drawn into the carbon-dioxide collecting device 15.

A system for collecting carbon dioxide in flue gas according to a third embodiment of the present invention is explained next with reference to the drawings.

Figure 5A:
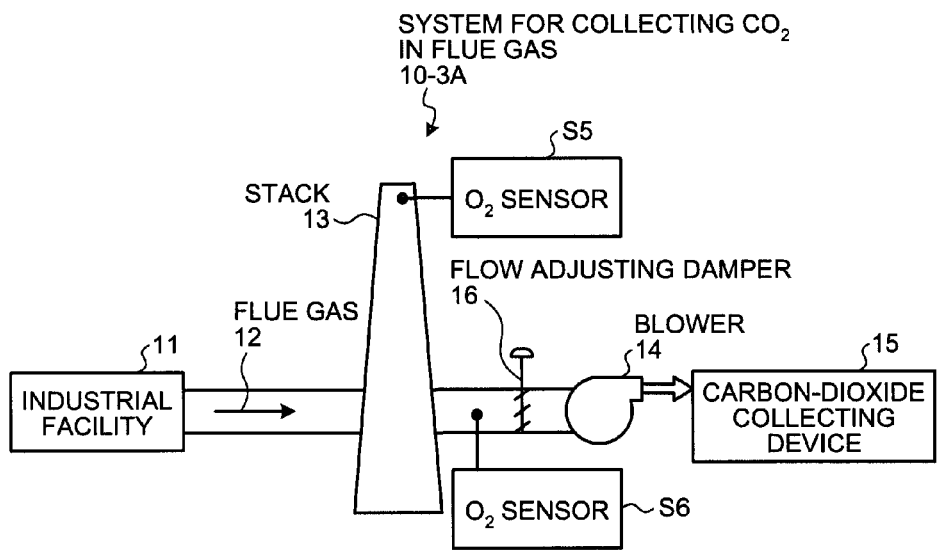
FIG. 5A is a schematic diagram of a system for collecting carbon dioxide in flue gas according to a third embodiment of the present invention.

FIG. 5A is a schematic diagram of the system for collecting carbon dioxide in flue gas according to the third embodiment.

As shown in FIG. 5A, a system for collecting carbon dioxide in flue gas 10-3A according to the third embodiment includes the stack 13 that discharges the flue gas 12 discharged from the industrial facility 11 to the outside, the blower 14 that is installed at the downstream side of the stack 13 and draws the flue gas 12 therein, the carbon-dioxide collecting device 15 that collects carbon dioxide in the flue gas 12 drawn in by the blower 14, and an $O_2$ sensor S5 arranged within the stack 13. In the $O_2$ sensor S5, the drawing amount of the flue gas 12 by the blower 14 to the carbon-dioxide collecting device 15 is increased until the oxygen gas concentration is raised, and when the oxygen gas concentration is raised, drawing in any more than that amount is stopped and the carbon dioxide in the flue gas 12 is collected while the flue gas 12 is drawn in by a substantially constant amount.

That is, in the $O_2$ sensor S5, the $O_2$ sensor S5 monitors all the time the oxygen concentration of the flue gas to be discharged from the stack 13 to the outside.

Figure 6:
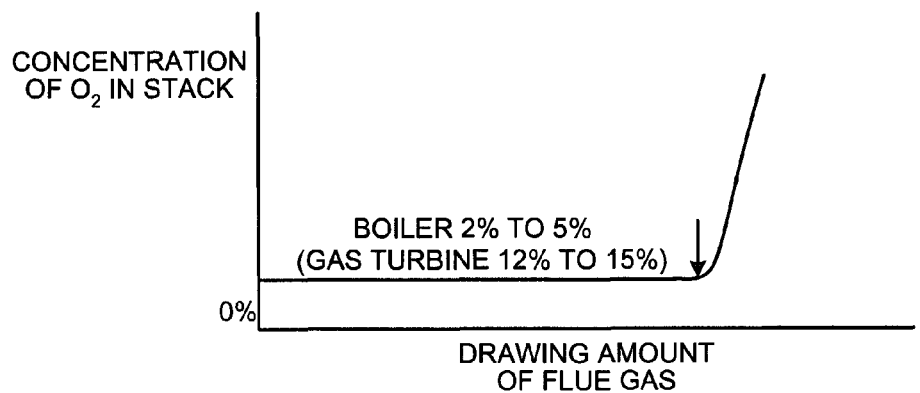
FIG. 6 depicts a relationship between oxygen concentration from a stack and a drawing amount of flue gas in the third embodiment.

Even when the drawing amount of the flue gas 12 by the blower 14 to the carbon-dioxide collecting device 15 is increased, the oxygen concentration of flue gas from the stack is maintained almost at constant (in a case of the flue gas from a boiler, it is 2 to 5%, and in a case of the flue gas from a gas turbine, it is 12 to 15%) up to a certain time point as shown in FIG. 6. However, when atmosphere from outside of the stack 13 flows into the stack, oxygen in the atmosphere is mixed in the flue gas 12, and the oxygen concentration is raised. Immediately before the concentration change in oxygen starts (a point indicated by an arrow in FIG. 6), drawing in any more flue gas 12 by the blower 14 is stopped, and carbon dioxide in the flue gas 12 is collected by the carbon-dioxide collecting device 15 while drawing in the flue gas 12 by the blower 14, maintaining the stopped drawing amount (substantially constant amount) at the same time.

Accordingly, all of the flue gas from the industrial facility 11 can be stably drawn into the carbon-dioxide collecting device 15 and all of the carbon dioxide in flue gas can be collected.

In FIG. 5A, an $O_2$ sensor S6 is installed at the upstream side of the blower 14 at the downstream side of the stack 13, and the oxygen concentration can be measured by the $O_2$ sensor S6 instead of the $O_2$ sensor S5. At this time, the $O_2$ sensor S5 can be used together so that the oxygen concentration can be measured by the both sensors S5 and S6.

Figure 5B:
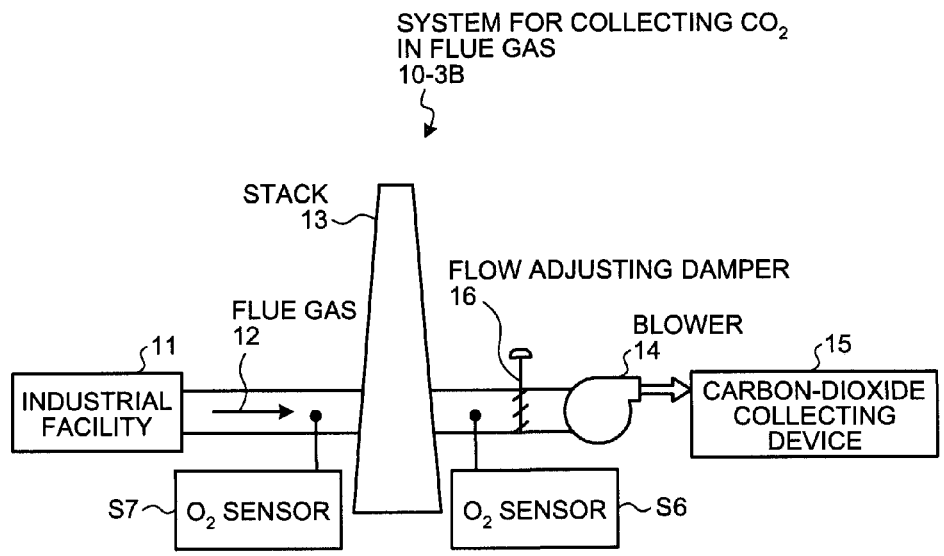
FIG. 5B is a schematic diagram of another system for collecting carbon dioxide in flue gas according to the third embodiment.

FIG. 5B depicts another system for collecting carbon dioxide in flue gas 10-3B according to the third embodiment. An $O_2$ sensor S6 is arranged at the downstream side of the stack 13 and before the blower 14, and an $O_2$ sensor S7 is also arranged within the stack flue at the upstream of the stack 13.

In the $O_2$ sensors S6 and S7, the drawing amount of the flue gas 12 by the blower 14 to the carbon-dioxide collecting device 15 is increased until a difference in the oxygen concentration in the flue gas is generated, and when the difference in the oxygen concentration is generated, drawing in any more than that amount is stopped and carbon dioxide in the flue gas is collected while drawing in the flue gas by a substantially constant amount.

Accordingly, all of the flue gas from the industrial facility 11 can be stably drawn into the carbon-dioxide collecting device 15.

A system for collecting carbon dioxide in flue gas according to a fourth embodiment of the present invention is explained next with reference to the drawings.

Figure 7A:
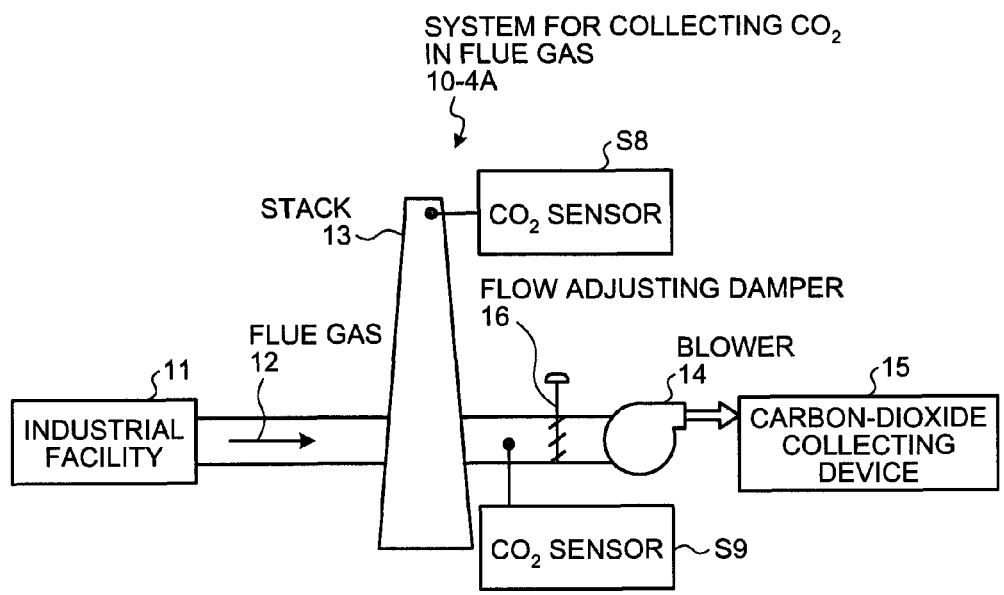
FIG. 7A is a schematic diagram of a system for collecting carbon dioxide in flue gas according to a fourth embodiment of the present invention.

FIG. 7A is a schematic diagram of the system for collecting carbon dioxide in flue gas according to the fourth embodiment.

As shown in FIG. 7A, a system for collecting carbon dioxide in flue gas 10-4A according to the fourth embodiment includes the stack 13 that discharges the flue gas 12 discharged from the industrial facility 11 to the outside, the blower 14 that is installed at the downstream side of the stack 13 and draws the flue gas 12 therein, the carbon-dioxide collecting device 15 that collects carbon dioxide in the flue gas 12 drawn in by the blower 14, and a $CO_2$ sensor S8 arranged within the stack 13. In the $CO_2$ sensor S8, the drawing amount of the flue gas 12 drawn in by the blower 14 to the carbon-dioxide collecting device 15 is increased until the carbon dioxide gas concentration is raised, and when the carbon dioxide gas concentration is raised, drawing in any more than that amount is stopped, and the carbon dioxide in the flue gas is collected while the flue gas is drawn in by a substantially constant amount.

That is, in the $CO_2$ sensor S8, the $CO_2$ sensor S8 monitors all the time the carbon dioxide concentration of the flue gas to be discharged from the stack 13 to the outside.

Figure 8:
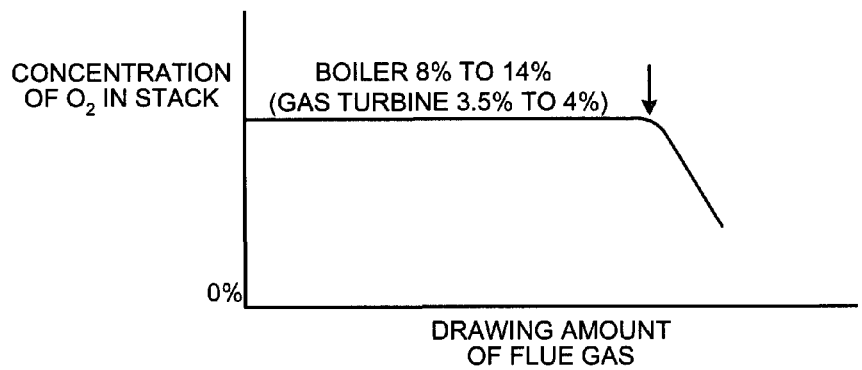
FIG. 8 depicts a relationship between oxygen concentration of flue gas from a stack and a drawing amount of flue gas in the fourth embodiment.

Even when the drawing amount of the flue gas 12 by the blower 14 to the carbon-dioxide collecting device 15 is increased, the carbon dioxide concentration of flue gas from the stack is maintained almost at constant (in a case of the flue gas from a boiler, it is 8 to 14% and in a case of the flue gas from a gas turbine, it is 3.5 to 4%) up to a certain time point as shown in FIG. 6. However, when atmosphere flows in the stack from outside of the stack 13, carbon dioxide in the atmosphere is mixed in the flue gas 12, and the carbon dioxide concentration is raised. Immediately before the concentration change of the carbon dioxide starts (a point indicated by an arrow in FIG. 8), drawing in any more flue gas 12 by the blower 14 is stopped, and the carbon dioxide in the flue gas 12 is collected by the carbon-dioxide collecting device 15 while drawing in the flue gas 12 by the blower 14 while maintaining the stopped drawing amount (substantially constant amount).

Accordingly, all of the flue gas from the industrial facility 11 can be stably drawn into the carbon-dioxide collecting device 15 and all of the carbon dioxide in flue gas can be collected.

In FIG. 7A, a $CO_2$ sensor S9 is installed at the upstream side of the blower 14 at the downstream side of the stack 13, and the carbon dioxide concentration can be measured by the $CO_2$ sensor S9 instead of the $CO_2$ sensor S8. At this time, the $CO_2$ sensor S8 can be used together so that the oxygen concentration can be measured by both the sensors S8 and S9.

Figure 7B:
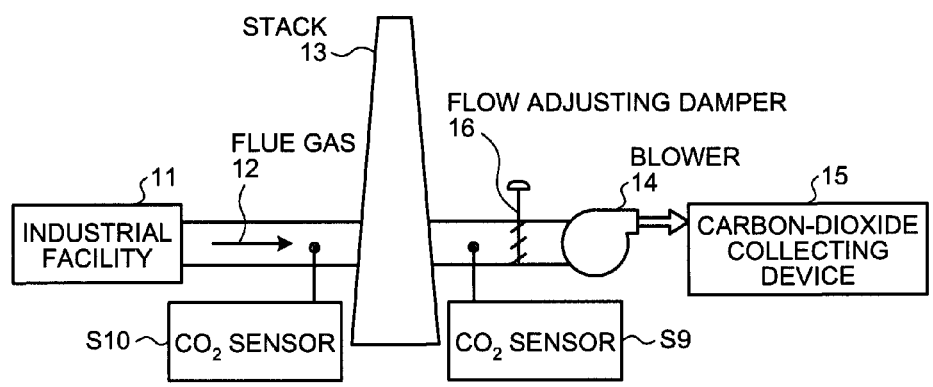
FIG. 7B is a schematic diagram of another system for collecting carbon dioxide in flue gas according to the fourth embodiment.

FIG. 7B depicts another system for collecting carbon dioxide in flue gas 10-4B according to the fourth embodiment. The $CO_2$ sensor S9 is arranged at the downstream side of the stack 13 and before the blower 14, and a $CO_2$ sensor S10 is also arranged in the stack flue at the upstream of the stack 13.

In the $CO_2$ sensors S9 and S10, the drawing amount of the flue gas 12 by the blower 14 to the carbon-dioxide collecting device 15 is increased until a difference in the carbon dioxide concentration in the flue gas is generated, and when the difference in the carbon dioxide concentration is generated, drawing in any more than that amount is stopped, and the carbon dioxide in flue gas is collected while drawing in the flue gas by a substantially constant amount.

Accordingly, all of the flue gas from the industrial facility 11 can be stably drawn into the carbon-dioxide collecting device 15.

To achieve more accurate control, the first to fourth embodiments can be appropriately combined to use a plurality of different sensors and to perform the control.

According to the present invention, substantially all of a large amount of flue gas can be drawn into a carbon-dioxide collecting device with a simple facility and in a stable and safe manner.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A system for collecting carbon dioxide in flue gas, comprising:
- a stack that has an entrance and an exit of the flue gas, the exit being arranged at a top of the stack, and the entrance being arranged at a lower portion of the stack and, connected to an industrial facility for taking in the flue gas to be discharged to outside from the exit;
- a blower that is installed at a downstream side of the stack and draws the flue gas therein;
- a carbon-dioxide collecting device that collects carbon dioxide in the flue gas drawn in by the blower;
- one or more sensor(s) measuring gas temperature or gas type, one of the one or more sensor(s) being arranged at a position within the stack at the exit of the flue gas; and
- a controller connected to the blower and the sensor, the controller receiving signals corresponding to the gas temperature or the gas type from the sensor, wherein
- the controller is configured to control the blower to increase a drawing amount of the flue gas to the carbon-dioxide collecting device until the gas temperature or a concentration of the gas type changes in the sensor due to atmosphere flowing into the stack from the exit of the flue gas, and
- the controller is configured to stop drawing in any more than the amount immediately before the gas temperature or the concentration of the gas type start changing, and to control the blower to draw in the flue gas by a substantially constant amount.

2. The system for collecting carbon dioxide in flue gas according to claim 1, wherein the gas type is oxygen or carbon dioxide.

* * * * *